July 2, 1940.  J. L. BLOOMHEART  2,206,688
VAPORIZER
Filed April 20, 1939  2 Sheets-Sheet 1
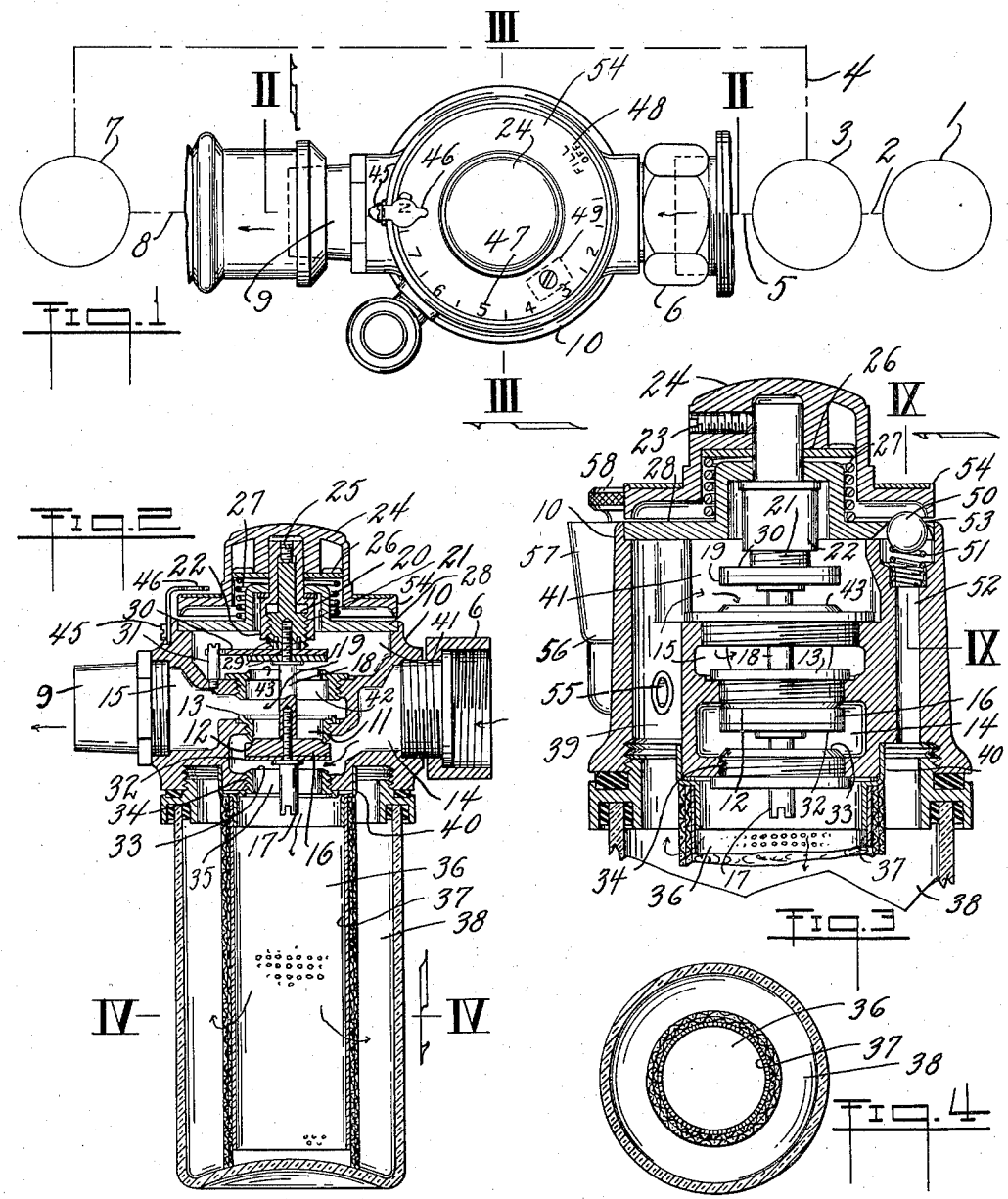
John L. Bloomheart
Inventor July 2, 1940.  J. L. BLOOMHEART  2,206,688
VAPORIZER
Filed April 20, 1939   2 Sheets-Sheet 2
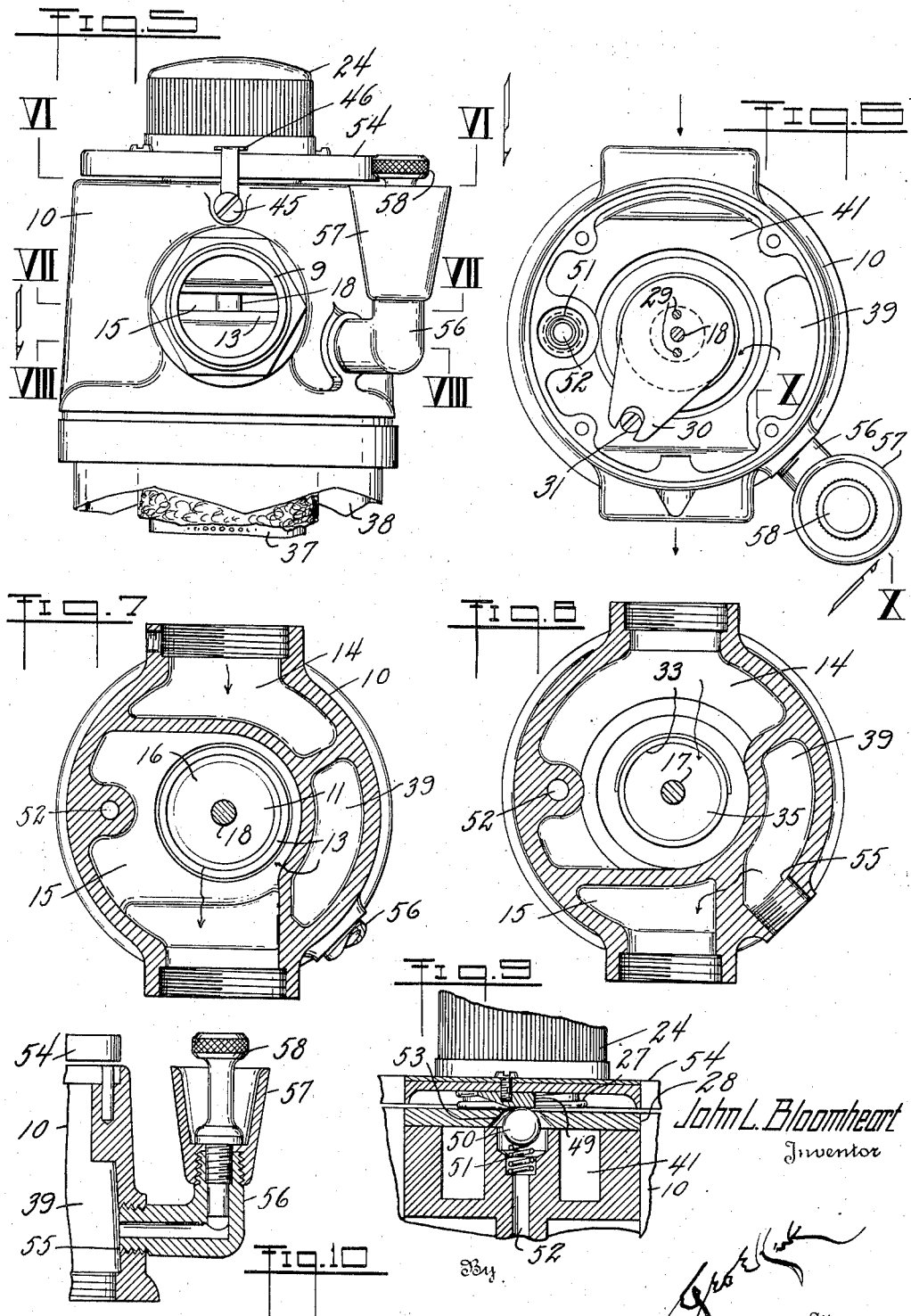

Patented July 2, 1940

2,206,688

UNITED STATES PATENT OFFICE 2,206,688

VAPORIZER

John L. Bloomheart, Toledo, Ohio, assignor to Martha F. McKesson, Toledo, Ohio

Application April 20, 1939, Serial No. 268,997

3 Claims. (Cl. 128—186)

This invention relates to gas administration, especially for analgesia and anaesthesia.

This invention has utility in selective control for vaporizing as ether.

Referring to the drawings:

Fig. 1 is a fragmentary view, partially diagrammatic and in plan as to the ether cup or vaporizer;

Fig. 2 is a section on the line II—II, Fig. 1, showing the vaporizer and valve device of the head in open position for ether entrained gas supply to a patient;

Fig. 3 is an enlarged detail view of the head on the line III—III, Fig. 1, showing the valve control in the head fully closed;

Fig. 4 is a section on the line IV—IV, Fig. 2, showing the concentric grouping in the container of a foraminous wall of the vaporizer concentric with the head;

Fig. 5 is a view of the head from the left of Fig. 2;

Fig. 6 is a section on the line VI—VI, Fig. 5, showing features of the head and control;

Fig. 7 is a section on the line VII—VII, Fig. 5, showing the intermediate chamber of the head and its delivery flow from the upper side of the intermediate valve seat;

Fig. 8 is a section on the line VIII—VIII, Fig. 5, showing the port arrangement in the head for the supply flow to the under side of the intermediate valve seat;

Fig. 9 is a section on the line IX—IX, Fig. 3, showing features of the relief valve control; and Fig. 10 is a section on the line X—X, Fig. 6, showing the filling or pouring plug connection.

Source of anaesthesia or analgesia gases may be either nitrous oxid, oxygen, carbon dioxid, or various combinations thereof through means of gas administering apparatus such as shown in United States Letters Patent No. 2,144,479 of January 17, 1939.

From such machine 1, by duct connection 2, there may be absorber 3 to contribute to efficiency in taking exhaled gas from duct 4 and removing carbon dioxid therefrom instead of duct 2 passing directly by way 5 to fitting 6. This exhalation duct 4 may be from mask 7, to which supply duct 8 extends from fitting 9 opposite the fitting 6. Between these fittings 6, 9, in the instance it be desired to supplement a gas administration with other agent as ether, head 10 is introduced. Concentrically through this head 10 is intermediate port 11 provided with seat 12 in ring 13. Communication from supply gas fitting 6 may be by way of passage 14 through this port 11 to passage 15 in communication with the duct 8 through fitting 9, when closure member 16 is unseated as to seat 12. This closure member 16 is mounted by threaded member 17 on stem 18 carrying supplemental closure member 19 as this stem 18 is mounted in primary stem portion 20 having thread assembly 21 with nut 22 anchored by set screw 23 with control cap 24. Set screw 25 serves as a stop limiting the travel distance for this stem member 20 as to the nut member 22. Disk 26 abuts helical compression spring 27 as against closure 28 for the head 10. There is thus a holding of this cap 24 against casual shifting. Assurance is had that rotation of this cap 24 may effect longitudinal travel of the closure members 16, 19.

To this end, fixed with the stem member 20 by pins 29 is forked terminus arm 30 engaging pin 31. Accordingly, as the cap 24 is rotated, the stem sections 17, 18, 20, are held against such rotation and the closure member 16 is moved toward or from the seat 12. In moving from the seat 12, this closure member 16 as provided with compressible face 32, engages seat 33 of ring 34, and thereby closes port 35 in communication with central chamber 36 surrounded by foraminous tubular wall 37 in receiver 38. This wall 37 may be of fabric wicking or material susceptible to capillary attraction for the ether so that, as the ether is drawn up thereby, gas flow from the chamber 36 through the wall 37 to chamber section 38 may be impregnated with the vapor and rise through by-pass passage 39. This foraminous wall vaporizer holder for the foraminous partition 37 is mounted by fitting 40 concentric with the ports in the valve control device as well as concentric with the receiver or reservoir 38. These vapors, rising through by-pass 39 to chamber 41 with closure member 19 lifted, may pass through port 42 at valve seat 43 and thus enter the passage 15. The position of the closure 16 which opens the valve port 35 closes the under side of the valve port 11. There is accordingly herein straightaway action in this common control device from the cap 24 for fully or partially opening the way to the vaporizer as a by-pass for the flow between the fittings 6 and 9.

Fixed with the head 10 by screw 45 (Fig. 1) is pointer or indicator 46. The cap 24 carries graduations 47 which, as shiftable with the head 24 as to this pointer or marker 46, indicate the extent of opening or closing as effected by the position of the closures 16, 19. The closure 19 has, on its under side, a compressible face to engage the seat 43 analogous to the compressible seat 32 for the closure 16.

At the down or closed position of the closure 16 as to the seat 32, thereby to cut off the vaporizer, step is taken herein to avoid building up of pressure in this vaporizer which might arise say from increase in temperature and other pressure increasing factors. To such end, at "off" position 48 (Fig. 1) as at the indicator 46, cam 49 (Fig. 9) is in position to act on ball 50 against compression spring 51 and thereby open way through duct 52 from the chamber 38 for pressure escape through port 53 under flange 54 of the cap 24, clear of the closure 28. This provision is such not necessarily to deplete the charge of ether in the ether cup or vaporizer but is a safeguard to avoid building up of pressure therein.

Also this position 48 is appropriate for charging the container for "fill." Accordingly, from the by-pass 39 there is mounted at port 55 (Figs. 3, 10) fitting 56 having funnel 57 and closure plug 58 which may be removed for permitting a charge of the desired number of drops or quantity of ether and the closure 58 reset.

In the operation hereunder, this ether cup or vaporizer placed between the gas administering machine and the mask permits ready impregnation of the administered gas with a vaporizable substance as ether or a by-passing through this device independently of vaporization. This use independently of the vaporization is with the closure 16 at the port 32 and the closure 19 at the port 42. The showing in Fig. 1 is at fully open position. Accordingly, such corresponds to the showing in Fig. 2, which means full use of the vaporizer instead of by-passing the vaporizer. In positioning the cap 24 for positions intermediate the fully open position (Fig. 1) and the "off" or "fill" positions remote therefrom, the closures 16, 19, are in the adjusted positions to effect mixing of the ether in the desired proportion between the fully cutting off and fully on positions therefor.

What is claimed and it is desired to secure by United States Letters Patent is:

1. A vaporizer valve head having a central way, there being three seats in aligned sequence in said way, a passage through the head clear of the seats, a first port to one side of the intermediate seat and a second port to the other side of the intermediate seat, a control device having closure means to be positioned at said seats, said head being adapted to have a reservoir thereon, and relief means for the reservoir adapted to be positively acted upon by the control device at non-delivery position for the closure means as to the reservoir.

2. A vaporizer valve head having a central way from a vaporizer port to a chamber, there being three coaxial seats in succession along said way, and a passage along side of said way through the head from a second vaporizer port adjacent said first vaporizer port to said chamber, there being a port on one side of the intermediate seat and another port on the other side of the intermediate seat, a single valve stem, valve closure means on the stem spaced to cooperate in one direction of shifting by the stem to close both terminal seats, said stem mounting one of said closure means for cooperating with the intermediate seat.

3. A vaporizer valve head having a central way from a vaporizer port to a chamber, there being three coaxial seats in succession along said way, and a passage along side of said way through the head from a second vaporizer port adjacent said first vaporizer port to said chamber, there being a port on one side of the intermediate seat and another port on the other side of the intermediate seat, a single valve stem, and three valve disks on the stem spaced to cooperate two at a time with said valve seats, with said passage providing communication in the head between the sides of the terminal seats away from the intermediate seat.

JOHN L. BLOOMHEART.